United States Patent
Gorin et al.

(10) Patent No.: US 10,913,203 B2
(45) Date of Patent: Feb. 9, 2021

(54) ADDITIVE MANUFACTURED CARBON MICHAEL ADDITION ARTICLES AND METHOD TO MAKE THEM

(71) Applicant: Dow Global Technologies LLC, Midland, MI (US)

(72) Inventors: Craig F. Gorin, Midland, MI (US); Sanjay C. Solanki, Midland, MI (US); Xin Jin, Berwyn, PA (US); Aleksander J. Pyzik, Midland, MI (US); Yuanqiao Rao, Berwyn, PA (US)

(73) Assignee: Dow Global Technologies LLC, Midland, MI (US)

( * ) Notice: Subject to any disclaimer, the term of this patent is extended or adjusted under 35 U.S.C. 154(b) by 285 days.

(21) Appl. No.: 16/060,703

(22) PCT Filed: Nov. 18, 2016

(86) PCT No.: PCT/US2016/062661
§ 371 (c)(1),
(2) Date: Jun. 8, 2018

(87) PCT Pub. No.: WO2017/095658
PCT Pub. Date: Jun. 8, 2017

(65) Prior Publication Data
US 2018/0362784 A1     Dec. 20, 2018

Related U.S. Application Data

(60) Provisional application No. 62/261,919, filed on Dec. 2, 2015.

(51) Int. Cl.
*B29C 64/118* (2017.01)
*B33Y 10/00* (2015.01)
(Continued)

(52) U.S. Cl.
CPC ............ *B29C 64/118* (2017.08); *B33Y 10/00* (2014.12); *B33Y 70/00* (2014.12); *C08G 61/12* (2013.01);
(Continued)

(58) Field of Classification Search
None
See application file for complete search history.

(56) References Cited

U.S. PATENT DOCUMENTS

| 4,575,330 A | 3/1986 | Hull |
| 5,121,329 A | 6/1992 | Crump |

(Continued)

FOREIGN PATENT DOCUMENTS

| CN | 107107480 A | 8/2017 |
| EP | 2161312 | 3/2010 |
| WO | 2016085992 | 6/2016 |

*Primary Examiner* — Cachet I Proctor

(57) ABSTRACT

An additive elastomeric manufactured part is comprised of extrudates comprised of a reaction product of a multifunctional Michael donor and multifunctional Michael acceptor and a rheological modifier. The additive elastomeric manufactured part may have a high elongation and resistance to heat. Said part may be made by dispensing a mixture of the multifunctional Michael donor, multifunctional Michael acceptor, rheological modifier and a catalyst through a through a nozzle to form an extrudate deposited on a base. The base, nozzle or combination thereof is moved while dispensing the mixture so that there is horizontal displacement between the base and nozzle in a predetermined pattern to form an initial layer of the material on the base. Subsequent layers are then formed on the initial layer by repeating the dispensing and movement on top of the initial layer and layers that follow.

20 Claims, 4 Drawing Sheets

(51) Int. Cl.
    *C08G 61/12*    (2006.01)
    *C08K 3/04*     (2006.01)
    *B33Y 70/00*    (2020.01)
    *C09D 11/102*   (2014.01)
    *B29K 105/00*   (2006.01)

(52) U.S. Cl.
    CPC .............. *C08G 61/127* (2013.01); *C08K 3/04* (2013.01); *C09D 11/102* (2013.01); *B29K 2105/0014* (2013.01); *B29K 2105/0094* (2013.01); *C08G 2261/312* (2013.01); *C08G 2261/334* (2013.01); *C08G 2261/42* (2013.01)

(56) References Cited

U.S. PATENT DOCUMENTS

| | | | |
|---|---|---|---|
| 5,503,785 A | | 4/1996 | Crump et al. |
| 5,597,589 A | | 1/1997 | Deckard |
| 6,129,244 A | | 10/2000 | Horth |
| 7,919,540 B2 | | 4/2011 | Heuts et al. |
| 8,313,006 B2 | | 11/2012 | Willner et al. |
| 9,873,766 B2 | * | 1/2018 | Boday ................ H05K 999/99 |
| 2005/0081994 A1 | | 4/2005 | Beckley et al. |
| 2006/0078742 A1 | * | 4/2006 | Kauffman ............. C08L 65/00 |
| | | | 428/411.1 |
| 2013/0040091 A1 | | 2/2013 | Dikovsky et al. |
| 2014/0343182 A1 | | 11/2014 | Jin et al. |
| 2015/0055266 A1 | | 2/2015 | Koshizuka et al. |
| 2015/0093544 A1 | | 4/2015 | Van De Vrie et al. |
| 2015/0218431 A1 | | 8/2015 | Jin et al. |
| 2016/0167299 A1 | * | 6/2016 | Jallouli ................. G02B 1/041 |
| | | | 351/159.73 |
| 2017/0100817 A1 | * | 4/2017 | Ganapathiappan ...... C09G 1/16 |
| 2017/0321083 A1 | * | 11/2017 | Fenn .................... B29C 64/112 |

* cited by examiner

ADDITIVE MANUFACTURED CARBON MICHAEL ADDITION ARTICLES AND METHOD TO MAKE THEM

FIELD OF THE INVENTION

The invention relates to a method of additive manufacturing of carbon Michael addition thermoset polymers.

BACKGROUND OF THE INVENTION

Additive manufacturing of thermoplastic polymers (typically nylon) is well known. For example, fused filament fabrication (FFF), which is also commonly called plastic jet printing has been used to form 3D parts by using thermoplastic filaments that are drawn into a nozzle heated, melted and then extruded where the extruded filaments fuse together upon cooling (see, for example, U.S. Pat. Nos. 5,121,329 and 5,503,785). Because the technique requires melting of a filament and extrusion, the materials have been limited to thermoplastic polymers (typically nylon, polyactic acid (PLA), acrylonitrile butadiene styrene (ABS)) and complex apparatus. In addition, the technique has required support structures that are also extruded when making complex parts that must survive the elevated temperature needed to form the part, while also being easily removed, for example, by dissolving it.

Selective laser sintering or melting (SLS or SLM) has been used to make 3D parts by selectively sintering powders in a bed of powder (see, for example, U.S. Pat. No. 5,597,589). In this method, a bed of powder maintained at elevated temperatures is selectively sintered using a $CO_2$ laser. Once a first layer has been sintered, a further layer of powder is metered out and the selective sintering repeated until the desired 3D part is made. Since the powder must be sintered or melted, SLS has been limited by the need for complex apparatus and use of thermoplastic polymers with very particular characteristics to allow for sintering without warping, slumping and achieving desired fusing particularly between layers. This generally has limited the applicability mostly to polyamides (i.e., nylon) or composite powders containing nylon.

Stereolithography (SLA) or photosolidification has also been used to make polymeric parts (see, for example, U.S. Pat. No. 4,575,330). SLA builds up successive layers from a photocurable resin contained in a vat using UV laser. The part being manufactured is supported by a platen within the vat which moves down as each layer is photocured to form the part. Just as for SLS and FFF, SLA is limited to particular photocurable polymeric resins and requires complex apparatus to form the parts.

It would be desirable to provide an additive manufacturing method and parts made therefrom that avoid one or more of the problems of the prior art such as those described above. Likewise, it would be desirable to provide an additive manufacturing method, material for use in such a method and parts that have elastomeric properties without heating or irradiating the material used to make such a part.

SUMMARY OF THE INVENTION

We have discovered an improved method of additive manufacturing comprising, (i) providing a multi-functional Michael donor, rheological modifier, a multi-functional Michael acceptor, and a catalyst, (ii) mixing the multi-functional Michael donor, the rheological modifier, the multi-functional Michael acceptor, and the catalyst to form a mixture, (iii) dispensing the mixture through a nozzle to form an extrudate deposited on a base, (iv) moving the base, nozzle or combination thereof while dispensing the mixture so that there is horizontal displacement between the base and nozzle in a predetermined pattern to form an initial layer of the extrudate on the base, and (v) repeating steps (ii) and (iv) to form a successive layer of the extrudate adhered on the initial layer to form an additive manufactured part comprised of a Michael addition compound. The method may repeat step (v) such that a plurality of successive layers are adhered and built up forming a larger additive manufactured part.

A second aspect the invention is an additive manufactured article comprised of extrudates adhered together in layers and between the layers, wherein the extrudates are comprised of a rheological modifier and a reaction product of a multifunctional Michael addition donor and a multifunctional Michael acceptor.

The improved additive manufacturing method may be used to form an additive manufactured polymeric part. The method is particularly suited to make thermoset elastomeric parts such as those used to mitigate noise, vibration or harshness (NVH) issues in mechanical systems or where high temperature use is required. Likewise the method avoids the use of hazardous materials such as isocyanates (polyurethane) typically used to make elastomeric parts with high temperature resistance.

DETAILED DESCRIPTION OF THE INVENTION

Figure 1:
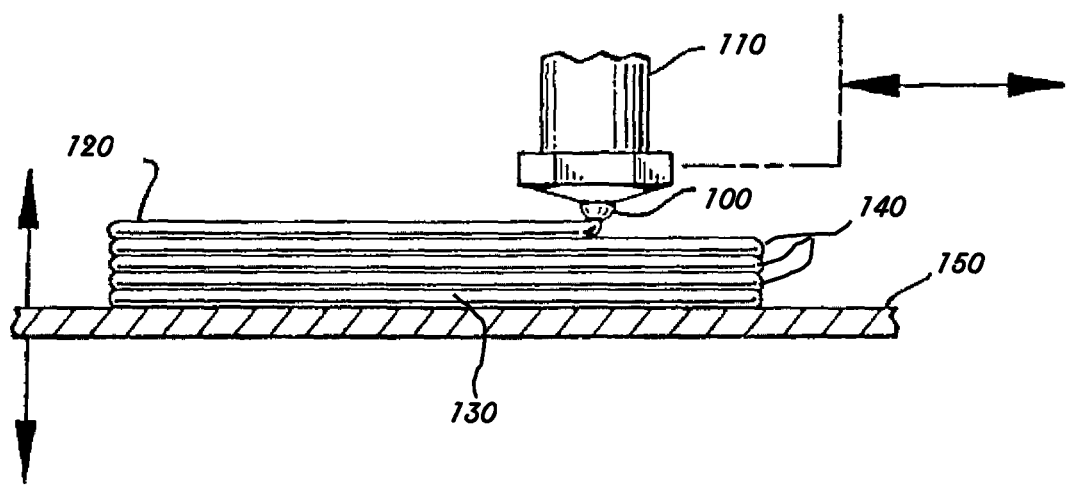
FIG. 1 is a side view of the additive manufactured article of this invention being made by the method of this invention.

The additive manufacturing method uses the following ingredients: a multifunctional Michael donor, a multifunctional Michael acceptor, rheological modifier and catalyst that are mixed, reacting the Michael donor and Michael acceptor to form a Michael addition compound. The Michael addition compound may be a thermoplastic or thermoset depending on the average functionality of the Michael donor and acceptor further described below. Desirably, the Michael addition compound is a thermoset.

The ingredients may be provided as one component or multiple components (2 or more). Generally, the material is provided as one component or two separate components. When the ingredients are provided as one component, a latent catalyst may be used and it may be activated by an externally applied agent such as heat, electromagnetic radiation or mechanical shear. Illustratively, and desirably, when the ingredients are provided as two components (separately until dispensed), the Michael acceptor and donor react with each other upon mixing just prior to dispensing to form the desired additive manufactured part. When the ingredients are supplied in two components (i.e., first material and second material), the first material will typically contain the Michael donor and a rheological modifier and the second material will contain the Michael acceptor and a rheological modifier. The rheological modifier may be different or the same in each of the first and second material. The catalyst may be in one or both of the first and second materials, but it is preferred that the catalyst is only contained in one of the first or second materials, with it being preferred that the catalyst is contained with the material having the Michael donor.

The Michael addition reaction involves the addition of a nucleophile, which may be referred to as a Michael donor, to an electrophile, which may be referred to as a Michael acceptor. The Michael donor is a multifunctional Michael donor. In a number of embodiments, the Michael donor can be an acetoacetate compound, e.g., a multifunctional acetoacetate compound. The Michael acceptor may be a multifunctional acrylate compound. In a number of embodiments, the Michael addition compound is a reaction product of a multifunctional acrylate compound with a multifunctional Michael donor.

The multifunctional Michael acceptor may be an acrylate compound. As used herein "acrylate" includes acrylates and (meth)acrylates. While not being bound to theory, Michael acceptor functionalities, for purposes of this disclosure, refer to an activated alkene having an aliphatic carbon-carbon double or triple bond alpha to a carbonyl (an "enone" group) or, a nitro group. The multifunctional acrylate compound can have 2 Michael acceptor functionalities to 10 Michael acceptor functionalities. For example, the multifunctional acrylate compound can have 2, 3, 4, 5, 6, 7, 8, 9, or 10 Michael acceptor functionalities.

Examples of the multifunctional acrylate compound include, but are not limited to, bisphenol A epoxy diacrylate, bisphenol A glycerolate (1 glycerol/phenol) diacrylate, 1,4-butanediol diacrylate, 1,6-hexanediol diacrylate, neopentyl glycol diacrylate, diethylene glycol diacrylate, triethylene glycol diacrylate, tetraethylene glycol diacrylate, polyethylene glycol diacrylate, dipropylene glycol diacrylate, tripropylene glycol diacrylate, cyclohexane dimethanol diacrylate, alkoxylated hexanediol diacrylate, alkoxylated cyclohexane dimethanol diacrylate, propoxylated neopentyl glycol diacrylate, trimethylolpropane triacrylate, ethoxylated trimethylolpropane triacrylate, propoxylated trimethylolpropanetriacrylate, acrylated polyester oligomer, bisphenol A diacrylate, acrylated bisphenol A diglycidylether, ethoxylated bisphenol A diacrylate, tris(2-hydroxy-ethyl) isocyanurate triacrylate, acrylated aliphatic urethane oligomer, acrylated aromatic urethane oligomer, acrylated polyester oligomer, and combinations thereof, among others. One or more embodiments of the present disclosure provide the multifunctional acrylate compound is selected from the group of trimethylolpropanetriacrylate, pentaerythritoltetraacrylate, di-trimethylolpropanetertraacrylate, di-pentaerythritol-hexaacrylate, di-pentaerthritolpentaacrylate, diacrylate of diglycidyl ether bisphenol-A, ethoxylated trimethylolpropane triacrylate, tricyclodecanedimethanol diacrylate, and cyclohexanedimethanol diacrylate, and combinations thereof.

The Michael addition compound is a reaction product of the multifunctional Michael acceptor with the multifunctional Michael donor. While not being bound to theory, Michael donor functionalities, for purposes of this disclosure, are groups that in the presence of a Michael addition catalyst form a carbanion that reacts with the carbon-carbon double or triple bond of a Michael acceptor group to form a carbon-carbon bond to the Michael acceptor group.

The multifunctional Michael donor may be an ester of an alcohol, such as methanol, ethanol, tertiary butanol, and 2-hydroxyethyl (meth)acrylate, among others. The ester can be an acetoacetate ester, a cyanoacetate ester, a malonic acid ester, or a combination thereof, among other esters. Examples of the ester include, but are not limited to, tert-butyl 3-oxobutyrate, esters of polyhydric alcohols such as ethylene glycol, 1,2- or 1,3-propane diol, 1,4-butane diol, 1,2-butanediol, 1,6-hexanediol, neopentyl glycol, 2-methyl-1,3-propane diol, diethylene glycol, triethylene glycol, dipropylene glycol, tripropylene glycol, poly(propylene glycol), poly(ethylene glycol), cyclohexanedimethanol, trimethylol propane, triethylol propane, pentaerythritol, glycerin, glycerol, dipentaerythritol, di-trimethylolpropane, glucose, isosorbide, butyl ethyl propanediol, esters derived from polyester polyols, polyether polyols, or polyesteramide polyols, and combinations thereof, among others. The multifunctional Michael donor can be a multifunctional acetoacetate compound. In a number of embodiments, the multifunctional acetoacetate compound is selected from the group of acetoacetates derived from methanol, glycerol, trimethylolpropane, ethanol isosorbide, neopentylglycol, pentaerythritol, di-methylolpropane, di-pentaerythritol, di-pentaerythritol, propoxylated monosaccharides, trimethylol ethane, and combinations thereof.

The multifunctional Michael acceptor and the multifunctional Michael donor may be reacted in any useful molar ratio such as a range of 1/3 to 3 of multifunctional Michael acceptor functionalities to moles of the Michael donor functionalities. The multifunctional Michael acceptor and the multifunctional Michael donor may be reacted in any ratio within the aforementioned range such as 1/2, 3/4, 7/8, 9/8, 5/4, 2 moles of multifunctional Michael acceptor functionalities to moles of the Michael donor functionalities. Desirably, the ratio is near stoichiometric such as a ratio between 3/4 and 5/4.

In choosing a specific multi-functional Michael donor and a specific multi-functional Michael acceptor to include in the functional mixture, it is desirable to consider the functionalities. It is generally believed that reacting a Michael donor with functionality of 2 with a Michael acceptor with a functionality of 2 will lead to linear molecular structures having a thermoplastic nature. It is desirable to create molecular structures that are branched and/or crosslinked, which is believed to require the use of at least one of the Michael donor or acceptor having a functionality of 3 or greater. Therefore, it is preferred to have at least one Michael donor or at least one Michael acceptor or both have functionality of 3 or greater. In some embodiments, the average functionality of all the Michael donors and all the Michael acceptors when mixed together (mixed material) has an average functionality of greater than 2; in some embodiments, that average functionality is 2.5 or greater; or 3 or greater; or 4 or greater.

The rheological modifier is one that imparts desired rheological properties enabling the mixed material (mixture that is extruded), prior to curing, to take the shape of the nozzle opening and to substantially retain that shape upon being extruded from the nozzle while being built up into multiple layers. Generally, the material has a high viscosity at low shear to aid in the retention of the shape after being dispensed and prior to curing. Prior to curing means that less than about 5% of the Michael donor and acceptor groups have reacted. "High viscosity" means that the viscosity of the mixed material is at least about 10,000; 20,000; or 30,000 centipoise to about 2,000,000 or 1,000,000 centipoise.

When the ingredients are provided in more than one component such as the first and second material described above, it is preferred that the first and second material have a viscosity as described above and that is within about 50% or preferably 30% or 10% of the other material under the same shear strain rate close to the strain rate expected to be used to dispense the material. "Near" means the strain rate is ±50% of the strain rate typically used to dispense the reactive materials.

A useful indicative low shear measurement is one in which the viscosity is measured using a Brookfield viscometer using a number 5 spindle at the lowest rpm or using a AR2000 Rheometer available from TA Instruments, New Castle, Del. with a continuous flow method where a 4 degree cone plate of 20 mm diameter is used at 25 degree C. along with 152 micrometer gap and a shear sweep from 1 to 150 $s^{-1}$. The viscosity in centipoise at low shear is taken at a shear rate of 5 $s^{-1}$.

Likewise, the mixture or each component (first and second material) desirably has a lower viscosity at higher shear (i.e., is shear thinning) to aid in the ease of dispensing. Generally, it is desirable for the material to have a viscosity at 100 $s^{-1}$ that is at least 2, 3, 5, 10 or even 20 or more times less than at a shear rate of 5 $s^{-1}$.

In a particular embodiment, it is desirable for the mixture or either the first or second material to have a yield stress prior to flowing, which aids in the retention of the cross-sectional shape imparted upon dispensing through the nozzle opening. The yield stress is characterized by measuring G', the storage modulus, using a rheometer. In measuring the yield stress, the material is first mixed at high shear such as mixing in a container with paddle blades rotating at 200 rpm for about 1 minute. The material is then placed in a rheometer (e.g., AR2000 rheometer from TA Instruments) and an oscillatory stress sweep from 10 to 10,000 Pa at a frequency of 0.1 Hz is performed accordingly. A suitable measuring device geometry is a 25 mm parallel plate having a gap of about 1,000 micrometers. Prior to performing the sweep, a dynamic pre-shear is used to mitigate any residual normal force caused by setting the gap of the parallel plate. A suitable dynamic pre-shear consists of a 0.01 rad displacement at a frequency of 1 Hz for about 1 minute.

Generally, the yield stress is at least about 20 Pa, 30 Pa, 40 Pa to about 2000 Pa. Likewise, the time to recover the yield stress after being sheared to flow at high shear or the shear experienced upon dispensing is as short as possible. For example, it is desirable that at least about 50% of the yield stress is recovered after being shear in fractions of second or at most about 1, 5 or even 10 seconds.

Figure 2:
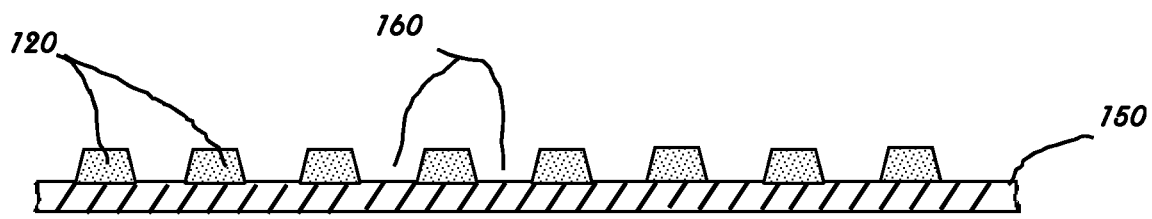
FIG. 2 is an end view of the extrudates of the initial layer being formed in the method of this invention.

The recovery of a sufficient amount of yield strength or stress may be determined by the material's sag performance after being sheared by a pump and applied to a substrate as described on page 5, lines 13-24 and FIGS. 1 and 2 of co-pending application PCT/US2015/055266. Sag of greater than about 2 mm is typically unacceptable for successful manufacturing of an additive manufactured part, but may depend on the cross-sectional size of the extrudate and size of the desired part. Preferably, the sag is less than 1 mm to in essence no or zero sag.

Suitable rheological modifiers may be any that assists in the imparting of the desired rheological properties described above. An illustrative filler is a particulate filler such as a carbon black, fumed silica, or other small (e.g., sub-micron sized particulate powder).

Depending on the particular Michael donor or acceptors used, the rheological modifier may range over a wide range of amounts. Likewise, when using a particulate rheological modifier such as carbon black the structure may vary over a wide range as given by oil absorption number (ASTM D-2414-09). For example, a particulate rheological modifier desirably has an oil absorption number (OAN) of about 80 to 200 ccs per 100 grams, when the Mz of the prepolymer is about 65,000. Preferably, the oil absorption of the particulate rheological modifier is at least about 90, more preferably at least about 100, and most preferably at least about 110 to preferably at most about 180, more preferably at most about 165 and most preferably at most about 150 ccs/100 grams.

In addition the particulate rheological modifier desirably has an iodine number that is at least 80. The iodine number is related to the surface area of the filler, but also to the presence of volatile species such as unsaturated oils and, sulfur containing compounds in the case of carbon blacks. The iodine number is determined using ASTM D1510-11.

Even though it is not understood, it has been discovered that even when the oil absorption number is lower than 80 ccs/100 grams, the material may achieve the desired rheological properties useful in the method of this invention. For example, the material may not display sag when the product of the OAN and iodine number of the filler is generally at least 6,000. Preferably, the product of the OAN (cc/100 g) and iodine number (mg/g) is in rising preference at least 7,000; 8,000; 9,000; 10,000; 11,000; 12,000; 13,000 to at most practically obtainable such as 50,000.

The amount of particulate rheological modifier (typically carbon black) suitable may be determined for a given mixture or first or second material, by routine experimentation. Typically, the amount of filler is at least in ascending desirability, 10%, 15%, 18%, 23 or 25% to at most, in ascending desirability, 38%, 35%, 32%, 30% or 28% by weight of the mixture or each component (first or second material).

When a carbon black is used as the rheological modifier, it may be a standard carbon black which is not specially treated to render it nonconductive. Standard carbon black is carbon black which is not specifically surface treated or oxidized. Alternatively, one or more nonconductive carbon blacks may be used exclusively or in conjunction with the standard carbon black. Suitable standard carbon blacks include RAVEN™ 790, RAVEN™ 450, RAVEN™ 500, RAVEN™ 430, RAVEN™ 420 and RAVEN™ 410 carbon blacks available from Colombian and CSX carbon blacks such as ELFTEX 720, S5100 and S7100 and MONARCH 120, 570, and 590 available from Cabot, and PRINTEX™ 30 carbon black available from Evonik Industries, Mobile, Ala. Suitable nonconductive carbon blacks include RAVEN™ 1040 and RAVEN™ 1060 carbon black available from Colombian Chemicals Company, Marietta, Ga.

The catalyst may be any one useful to catalyze the Michael addition reaction of the Michael donor and acceptor. The catalyst may include tertiary amine compounds, amidine compounds, quaternary ammonium hydroxides, alkali metal hydroxides, alkali metal alkoxides, alkali metal acetylacetonates, quaternary ammonium acetylacetonates, among others. Examples of the catalyst include, but are not limited to, tetramethyl ammonium hydroxide, tetraethyl ammonium hydroxide, tetrabutyl ammonium hydroxide, tetraoctyl ammonium hydroxide, trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl) ether, bis(2-dimethylaminoethyl) ether, morpholine, 4,4'-(oxydi-2,1-ethanediyl)bis, triethylenediamine, pentamethyl diethylene triamine, dimethyl cyclohexyl amine, N-cetyl N,N-dimethyl amine, N-coco-morpholine, N,N-dimethyl aminomethyl N-methyl ethanol amine, N,N,N'-trimethyl-N'-hydroxyethyl bis(aminoethyl) ether, N,N-bis(3-dimethylaminopropyl)N-isopropanolamine, (N,N-dimethyl) aminoethoxy ethanol, N, N, N',N'-tetramethyl hexane diamine, N,N-dimorpholinodiethyl ether, N-methyl imidazole, dimethyl aminopropyl dipropanolamine, bis(dimethylaminopropyl)amino-2-propanol, tetramethylamino bis (propylamine), (dimethyl(aminoethoxy-ethyl))((dimethyl amine)ethyl) ether, tris(dimethylamino propyl) amine, dicyclohexyl methyl amine, bis(N,N-dimethyl-3-aminopropyl) amine, 1,2-ethylene piperidine, methyl-hydroxyethyl piperazine, and combinations thereof, among others. One or more embodiments of the present disclosure provide the catalyst is selected from the group of 1,1,3,3-tetramethylguanidine, 1,8-diazabicyclo[5.4.0]undec-7-ene, 1,5-diazabicyclo[4.3.0]non-5-ene, tetramethylammonium hydroxide, (2 hydroxyethyl)tri-methylammonium hydroxide, potassium carbonate, potassium phosphate, potassium phenoxide, sodium phenoxide, tetraethylammonium hydroxide, and combinations thereof.

The catalyst may be any useful amount, but typically ranges from about 0.001 moles of catalyst per equivalent of multifunctional Michael donor to 1 mole of catalyst per equivalent of multifunctional Michael donor. All individual values and subranges from and including 0.001 moles of catalyst per equivalent of multifunctional Michael donor to 1 mole of catalyst per equivalent of multifunctional Michael donor are included herein and disclosed herein; for example the catalyst may have a concentration in a range with a lower limit of 0.001 moles, 0.002 moles, or 0.003 moles of catalyst per equivalent of multifunctional Michael donor to an upper limit of 1 mole, 0.98 moles, or 0.95 moles of catalyst per equivalent of multifunctional Michael donor.

The ingredients may be mixed by any known methods of mixing. Illustratively, when the ingredients are in one component, the ingredients may be premixed by known mixers useful to mix high viscosity materials. When ingredients are in a first and second material, they may be premixed using conventional mixers and then immediately or shortly thereafter extruded through a nozzle or the materials may be passed through a dynamic mixer or static mixer that is in-line with a nozzle.

Typically, the mixture is dispensed into an air atmosphere at any useful or suitable temperature. Surprisingly, the material may be dispensed without any applied heating and retain its shape sufficiently to form an additive manufactured part. Generally, that means at least a portion or all of the mixture flows under shear at ambient temperature (23° C.). The use of a material having the Michael donor and rheological modifier allows for the dispensing of an extrudate that retains the shape of the nozzle opening that it is extruded through.

Further ingredients may be used including other fillers and pigments. Such fillers may include, for example, titanium dioxide, aluminum oxide, zeolite, calcium carbonate, silica, titanium oxide, silica, talc, and the like. In one embodiment, more than one other filler may be used. The fillers are typically used in an amount sufficient to increase one or more desired property such as strength of the additive manufactured part.

Other optional fillers may include clays. Preferred clays include kaolin, surface treated kaolin, calcined kaolin, aluminum silicates and surface treated anhydrous aluminum silicates. The clays can be used in any form, which facilitates formulation of a dispensable material. Preferably, the clay is in the form of pulverized powder, spray-dried beads or finely ground particles. Clays may be used in an amount of about 0.1 parts by weight of the material or greater, more preferably about 12 parts by weight or greater and even more preferably about 18 parts by weight or greater. Preferably, the clays are used in an amount of about 30 parts by weight or less of the material, more preferably about 28 parts by weight or less and most preferably about 24 parts by weight or less.

Other ingredients may include stabilizers, which function to protect the Michael addition compound from environmental conditions such as UV light exposure. Such stabilizers may be used in an amount of about 0.1 parts by weight or greater based on the total weight of the material, preferably about 0.5 parts by weight or greater and more preferably about 0.8 parts by weight or greater. Such stabilizers are used in an amount of about 5.0 parts by weight or less based on the weight of the material, more preferably about 2.0 parts by weight or less and most preferably about 1.4 parts by weight or less.

Other ingredients may also include plasticizers, colorants, preservatives, odor masks, flame retardants, biocides, antioxidants, antistatic agents, and solvents. Examples of the surfactant include, but are not limited to, polyalkylene oxides and silicone based interfacial agents, such as organosilicone surfactants. Polyalkylene oxides, for example, can include random and/or block copolymers of ethylene and propylene oxides or ethylene and butylenes oxides, among others. An example of a polyalkylene oxide surfactant is a polyethylene oxide-co-butylene oxide triblock organic surfactant, which is sold under the tradename VORASURF™ 504 (available from The Dow Chemical Company). Examples of organosilicone surfactants include, but are not limited to, polysiloxane/polyether copolymers such as TEGOSTAB™ (available from Evonik Industries), B-8462 and B8469, DABCO™ DC-198 surfactant (available from Air Products and Chemicals), and NIAX™ L-5614 surfactant (available from Momentive Performance Products).

The surfactant may have a concentration in a range of 0.1 weight percent to 5.0 weight percent based upon a total weight of the multifunctional Michael donor and the multifunctional acrylate compound. All individual values and subranges from and including 0.1 weight percent to 5.0 weight percent based upon a total weight of the multifunctional Michael donor and the multifunctional acrylate compound are included herein and disclosed herein; for example the surfactant can have a concentration in a range with a lower limit of 0.1 weight percent, 0.2 weight percent, or 0.3 weight percent to an upper limit of 5.0 weight percent, 4.8 weight percent, or 4.5 weight percent based upon a total weight of the multifunctional Michael donor and the multifunctional acrylate compound.

The other ingredients may be used in any useful amount such as 0.1 parts by weight or greater based on the total weight of the mixture, preferably about 0.5 parts by weight or greater and more preferably about 0.8 parts by weight or greater. Such other ingredients typically are used in an amount of about 5.0 parts by weight or less based on the weight of the mixture, more preferably about 2.0 parts by weight or less and most preferably about 1.4 parts by weight or less.

Turning to FIGS. 1-4, the method comprises dispensing the material through nozzle 100 attached to the nozzle assembly 110 where the material may be mixed in-line if it is provided in more than one component. Upon dispensing the material forms an extrudate 120 that forms an initial layer 130 and successive layers 140 on base 150. Nozzle assembly 110 is depicted being orthogonal to base, but may be set at any useful angle to form the extrudate whereby the extrudate 120 and nozzle assembly 110 form an obtuse angle with the extrudate 120 being parallel to the base. In addition, the nozzle assembly 110 may be rotated about its longitudinal axis, for example, to reorient the shape of the opening in the nozzle 100, to create extrudate 120 having differing relationship to the base 150 as shown in FIGS. 1-4.

The relative motion of the base 150 and nozzle assembly 110 are also shown, but it is understood that the base 150, nozzle assembly 110 or both may be moved to cause the relative motion in any horizontal direction or vertical direction. The motion is made in a predetermined manner, which may be accomplished by any known CAD/CAM methodology and apparatus such as those well known in the art and readily available robotics or computerized machine tool interface. Such pattern forming is described, for example, in U.S. Pat. No. 5,121,329.

The extrudate 120 may be dispensed continuously or disrupted to form the initial layer 130 and successive layers 140. If disrupted extrudates 120 are desired, the nozzle may be comprised of a valve (not pictured) to shut off the flow of the material. Such valve mechanism may be any suitable mechanism such as any known electromechanical valves that can easily be controlled by any CAD/CAM methodology in conjunction with the pattern.

When the material is comprised of more than one component, the nozzle assembly 110 may also be comprised of a mixer such as an in-line static or dynamic mixer as well as separate compartments to hold the two components. In a particular embodiment, the static mixer has at least two zones wherein each zone is comprised of differing static mixer elements. Examples of two component dispensing apparatus and methods that may be suitable include those described in U.S. Pat. Nos. 6,129,244 and 8,313,006 and copending U.S. Appl. No. 61/977,668 having an inventor Huide Zhu as well as those described by Sulzer Chemtech, Mixpac Peeler II product Brochure and by Craig Blum, Two Component Adhesive Cartridge Systems, *FAST*, July 2008.

Because the material may be adhesive, the base 150 may be a low surface energy material such as a polyolefin (e.g., polyethylene or polypropylene) or fluorinated polymer such as Teflon and the like. Alternatively, the base may have a mold release agent such as those known in the polyurethane reaction injection molding art or the base may have a sheet of paper or film of a low energy material placed upon it prior to dispensing and forming the additive manufactured part.

More than one nozzle assembly 110 may be employed to make composite or gradient structures within the additive manufactured part. Likewise, a second nozzle assembly 110 may be employed to dispense a support structure that may be later removed so as to allow more complex geometries to be formed such as described in U.S. Pat. No. 5,503,785. The support material may be any that adds support and be removed easily such as those known in the art, for example, waxes.

Figure 3:
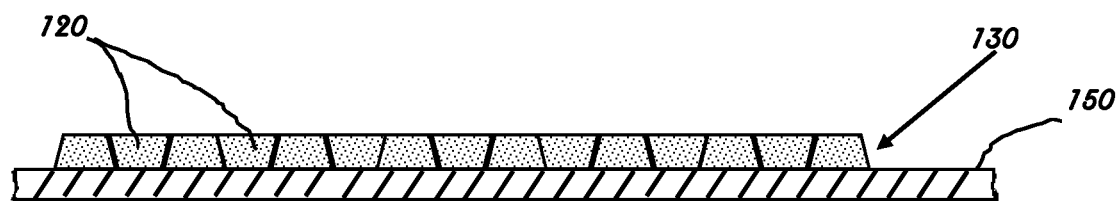
FIG. 3 is an end view of the finished initial layer of the method of this invention.
Figure 4:
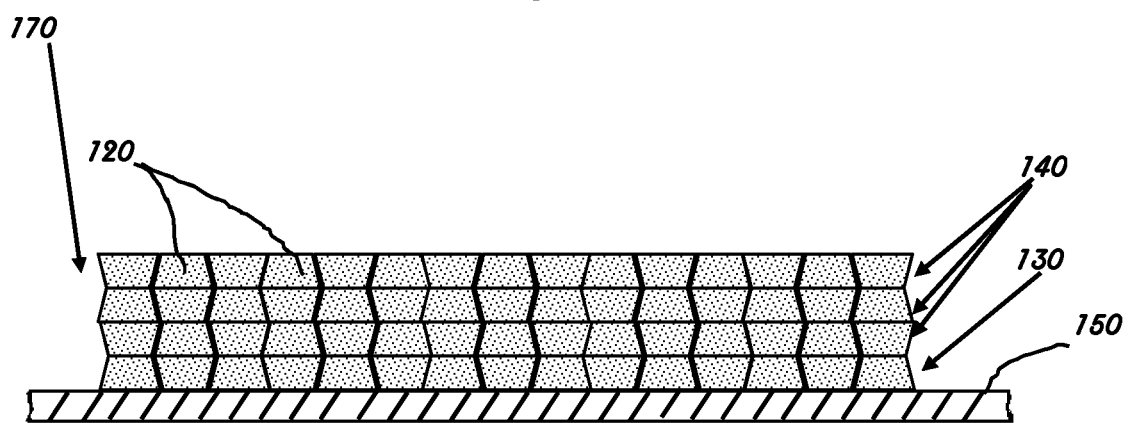
FIG. 4 is an end view of the initial layers and subsequent layers of the additive manufactured part made by the method of this invention.

In a particular embodiment, it has been discovered that improved dimensional control and uniformity of density may be achieved in the additive manufactured part by using differing shaped extrudates 120. FIG. 2, shows discontinuous (disrupted) extrudates 120 having trapezoidal cross-sectional shape, which are beginning to make initial layer 130 having gaps 160. In FIG. 3, the nozzle 100 (not pictured) is reoriented as described above and further extrudates 120 are dispensed filling in the gaps 160. The steps are repeated to form the successive layers 140 to form the additive manufactured part. If the outer surface 170 is desired to be a flat surface orthogonal to the base, the trapezoidal shape of the extrudate 120 may be varied in those extrudates 120 defining this surface so that it is essentially flat. In another embodiment, the trapezoidal extrudates 120 of FIG. 2, may be touching so that they form triangular gaps (not pictured) between them and subsequent extrudates (not pictured) may have a triangular shape that fits into such triangular gaps. The extrudates may have a cross-sectional shape that is any useful shape such as circular, oval or a polygon. Exemplary polygonal shapes are a rectangle, square, triangle, hexagon or trapezoid. The trapezoid may be an isosceles trapezoid. The cross-sectional shape of the extrudate may vary from one layer to another or within a layer.

The method surprisingly may be used to make thermoset elastomeric additive manufactured parts that have high decomposition temperatures. "Elastomeric" means that the additive part displays rubber like qualities such as at least about 50% elongation prior to break in tension. Preferably, the elongation at break under tension is at least 100%, 200% or even 300%. The elongation and break under tension may be determined by ASTM D412.

The decomposition temperature likewise surprisingly may be at least about 250° C. or 275° C., 300° C., 325° C. or even 350° C. The decomposition temperature is the temperature, where the onset of weight loss begins using thermogravimetric analysis under nitrogen from 20° C. to 500° C. with a temperature ramp of 10° C. per minute.

EXAMPLES

Example 1

A first component was made by mixing thirty grams (g) of ethoxylated (4) bisphenol A diacrylate, a Michael Acceptor, available from Sartomer Americas, Exton, Pa. under the designation SR601 and 3.7 g of carbon black, available from Orion Engineered Carbons LLC, Kingwood, Tex. under the designation FW200, having an average primary particle size of 14 nanometers. These were mixed for 2 minutes at 1000 rpm using a speed mixer. Then 0.98 g 1,1,3,3-tetramethyl-guanidine (TMG), a Michael addition catalyst, available from Sigma-Aldrich St. Louis, Mo. was added and further mixed for 2 minutes at 1000 rpm. A second component was made by mixing 18.23 g of trimethylolpropane tris acetoacetate, a Michael donor, available from Lonza Inc. Allendale N.J., and 2.2 g of FW200 carbon black were added to a separate container and mixed at 1000 rpm for 2 minutes using a speed mixer.

The first and second components were mixed and printed using a customized 3D printer. A high pressure two-component dispensing tool, a Nordson Equalizer 2K, Nordson Corporation, Westlake Ohio, was mounted on an UltraTT EFD automated dispensing system, Nordson Corporation, Westlake Ohio which acts as a programmable XYZ stage. The first and second components were loaded into one side of the two component syringe, and the components were pushed through an 8.6 cm length and 4.75 mm diameter disposable H-tapered series 190 Spiral Bayonet static mixer (7701436) with a luer lok adapter (7700943) and a 0.41 mm luer lok tapered nozzle (7018298) available from Nordson Corporation, to form a mixture that was extruded as a circular extrudate on to the XYZ table. The mixture was extruded at speed of 15 mm/sec using a pressure of 35 psi pressure. The XYZ table was controlled by a PalmPilot to form square and circular rings of various heights and inner and outer diameters. Step height between layers was 0.30 mm.

Tensile strength and elongation at break as per ASTM D412 standard was determined on a Texture Technologies TA-XT-Plus Texture analyzer (Texture Technologies Corp., Hamilton, Mass.). Thermogravimetric Analysis was performed by heating a 64 mg sample from 25° C. to 500° C. at 10° C./min under air on a Q500 TGA (Thermogravimetric Analyzer, TA Instruments, Inc., New Castle, Del.) to give decomposition temperature. The elongation at break was 65% and the tensile strength was 2.5 MPa. The decomposition temperature was 360° C. This decomposition temperature compared is substantially greater than the decomposition of a 3D printed elastomeric part formed from an isocyanate containing prepolymer described in Example 1 of co-pending application PCT/US2015/055266, which had a decomposition temperature of 220° C.

Illustrative Michael Acceptor and Donors

The following are illustrations of Michael acceptors and donors that may be useful in the method of the invention.

Illustration 1

A first component was made by mixing 11.5 g of SR601 and 0.5 g of SR444, pentaerythritol triacrylate available from Sartomer Americas, and 0.06 g of TMG at room temperature with a magnetic stir for 2 minutes. A second component was 2.9 g of methyl acetoacetate, a Michael donor, available from Sigma-Aldrich St. Louis, Mo. The first and second components were fully mixed for one minute by a strong magnetic agitation. The mixture was transferred into a 4 inch aluminum weighing pan. The mixture became a solid elastomer within 2 hours at room temperature elastomer.

The elongation at break of Illustration 1 was 404% and the tensile strength was 2.8 MPa. The glass transition temperature (Tg) was measured by a Q100 DSC (Differential scanning calorimetry), available from TA Instruments, Inc., New Castle, Del. The measurement conditions were from −90° C. to 250° C. at a 10° C./min heating rate. The Tg result was reported from the second heating cycle. The Tg of Illustration 1 was 11.4° C.

Illustration 2

The formulation and procedure of Illustration 1 were repeated, except 1.5 g of carbon black (ELFTEX 720), available from Cabot Corporation, Alpharetta Ga., was added to the first component. The mixture of the first and the second components became a solid elastomer within 2 hours at room temperature. The elongation at break of Illustration 2 was 286%, the tensile strength was 5.3 MPa and the Tg was 4.8° C.

Illustration 3

The procedure of Illustration 2 was repeated, except the formulation was modified as follows. The first component comprises 10 g of SR601 and 2 g of SR355, ditrimethylolpropane tetraacrylate available from Sartomer Americas, 0.075 g of TMG and 1.48 g of carbon black (ELFTEX 720). The second component comprises 2.71 g of methyl acetoacetate. The mixture of the first and the second components became a solid elastomer within 2 hours at room temperature. The elongation at break was 90%, the tensile strength was 6.9 MPa and the Tg was 15.2° C.

Illustration 4

A first component was made by mixing 11.5 g of SR601, 0.5 g of SR444, 2.9 g of methyl acetoacetate and 3.0 g of carbon black (ELFTEX 720) with a spatula for 4 minutes. A second component was 0.09 g of TMG in a 1 ml syringe. The second component was added to the first component dropwise with agitation by a spatula. The mixture was fully mixed for one more minute. The mixture was transferred into a 4 inch aluminum weighing pan and a second weighing pan was added to the top of the mixture. A slight pressure was applied to the top pan so as to prepare a uniform mixture layer between those two pans. The mixture became a solid elastomer within 2 hours at room temperature elastomer. The elongation at break was 212%, the tensile strength was 4.4 MPa and the Tg was 17.2° C.

The viscosity of the first component was measured by a Brookfield DV-III Ultra viscometer, available from Brookfield Engineering Laboratories, Inc., Middleboro, Mass. The temperature was 22° C. and the applied spindle was #64. The viscosity of the first component was shear dependent. The results were reported from the readings at 1 minute after spindle ran. The viscosity was 75,000 centipoise at a shear rate of 1 $s^{-1}$, 50,000 centipoise at a shear rate of 2 $s^{-1}$ and 11,000 centipoise at a shear rate of 6 $s^{-1}$ Illustration 5

The procedure of Illustration 4 was repeated, except the formulation was modified as follows. The first component comprises 2 g of SR355, 10 g of SR9038, ethoxylated (30) bisphenol A diacrylateavailable from Sartomer Americas, 1.7 g of methyl acetoacetate and 2.75 g of carbon black (ELFTEX® 720). The second component comprises 0.07 g of TMG. The mixture of the first and the second components became a solid elastomer within 2 hours at room temperature. The elongation at break was 94%, the tensile strength was 2.4 MPa and the Tg was −29.8° C.

Illustration 6

The procedure of Illustration 4 was repeated, except the formulation was modified as following. The first component comprises 0.5 g of SR444, 11.5 g of SR9038, 2.01 g of methyl acetoacetate and 2.82 g of carbon black (ELFTEX 720). The second component comprises 0.08 g of TMG. The mixture of the first and the second components became a solid elastomer within 2 hours at room temperature. The elongation at break was 318%, the tensile strength was 3.6 MPa and the Tg was −10.8° C.

The invention claimed is:

1. A method of additive manufacturing comprising,
   (i) providing a multi-functional Michael donor, rheological modifier, a multi-functional Michael acceptor, and a catalyst, wherein the multi-functional Michael donor is an ester of an alcohol and further wherein the catalyst is a tertiary amine compound, amidine compound, quaternary ammonium hydroxide, alkali metal hydroxide, alkali metal alkoxide, alkali metal acetylacetonate, quaternary ammonium acetylacetonates or mixture thereof,
   (ii) mixing the multi-functional Michael donor, the rheological modifier, the multi-functional Michael acceptor, and the catalyst to form a mixture,
   (iii) dispensing the mixture through a nozzle to form an extrudate deposited on a base,
   (iv) moving the base, nozzle or combination thereof while dispensing the mixture so that there is horizontal displacement between the base and nozzle in a predetermined pattern to form an initial layer of the extrudate on the base, and
   (v) repeating steps (ii) and (iv) to form a successive layer of the extrudate adhered on the initial layer to form an additive manufactured part.

2. The method of claim 1, wherein the method further comprises repeating step (v) such that a plurality of successive layers are adhered and built up forming the additive manufactured part.

3. The method of claim 1, wherein the mixture has a yield stress of at least about 20 Pa.

4. The method of claim 1, wherein the mixture, prior to curing, has a viscosity of at least 10,000 centipoise at a shear rate of 5 s$^{-1}$ and a viscosity that is at least 10 times less at a shear rate of 100 s$^{-1}$.

5. The method of claim 1, wherein the multi-functional Michael donor, and multi-functional Michael acceptor are separately provided in two separate components with a first component being comprised of the Michael donor and the rheological modifier and the second component being comprised of the Michael acceptor and rheological modifier, wherein the catalyst is provided in either the first component, second component or both.

6. The method of claim 5, wherein the nozzle is comprised of a mixer that is a static mixer, dynamic mixer or combination thereof in which the first and second components are mixed to form the mixture.

7. The method of claim 6, wherein the first and second component have a yield stress of at least about 20 Pa.

8. The method of claim 5, wherein the first and second component have a viscosity of at least 10,000 centipoise at a shear rate of 5 s$^{-1}$ and a viscosity that is at least 10 times less at a shear rate of 100 s$^{-1}$.

9. The method of claim 1, wherein the multifunctional Michael donor and the multifunctional Michael acceptor are provided at a donor/acceptor functionality molar ratio from 1/3 to 3.

10. The method of claim 9, wherein the donor/acceptor functionality molar ratio is 3/4 to 5/4.

11. The method of claim 1, wherein at least one of the multifunctional Michael addition donor or multifunctional Michael addition acceptor has an average functionality of 3.

12. The method of claim 1, wherein the multi-functional Michael acceptor is an acrylate compound.

13. The method of claim 1, wherein the extrudate has a cross-sectional shape that is a polygon.

14. The method of claim 1, wherein the predetermined pattern is such that extrudates having voids between them are first formed followed by dispensing of extrudates that deposit in said voids to form the initial layer or subsequent layer.

15. An additive manufactured article made by the method of claim 1.

16. The method of claim 1, wherein the rheological modifier has an oil absorption number in cc/100 g and iodine number in mg/g when multiplied together have a product that is at least 6000.

17. An additive manufactured article comprised of extrudates adhered together in layers and between the layers, wherein the extrudates are comprised of a rheological modifier and a reaction product of a multifunctional Michael addition donor and a multifunctional Michael acceptor, wherein the multi-functional Michael donor is an ester of an alcohol.

18. The additive manufactured article of claim 17, wherein the tensile elongation at break is at least 50%.

19. The additive manufactured article of claim 17, wherein the additive manufactured article has a decomposition temperature of at least 250° C.

20. The additive manufactured article of claim 17, wherein the rheological modifier has an oil absorption number in cc/100 g and iodine number in mg/g when multiplied together have a product that is at least 6000.

* * * * *